United States Patent [19]

Adam

[11] Patent Number: 4,656,268
[45] Date of Patent: Apr. 7, 1987

[54] BENZOQUINOPHTHALONE QUATERNARY AMMONIUM SALT DERIVATIVES

[75] Inventor: Jean-Marie Adam, Rosenau, France

[73] Assignee: Ciba-Geigy Corporation, Ardsley, N.Y.

[21] Appl. No.: 788,811

[22] Filed: Oct. 18, 1985

Related U.S. Application Data

[60] Division of Ser. No. 672,869, Nov. 19, 1984, Pat. No. 4,588,811, which is a continuation of Ser. No. 471,555, Mar. 3, 1983, abandoned.

[30] Foreign Application Priority Data

Mar. 10, 1982 [CH] Switzerland .......................... 1474/82

[51] Int. Cl.$^4$ .................. C07D 401/12; C07D 413/12; C07D 401/14
[52] U.S. Cl. .................................... 544/126; 544/113; 544/181; 544/198; 544/351; 544/361; 546/8; 546/9; 546/101
[58] Field of Search .............. 544/113, 126, 181, 198, 544/199, 351, 361; 546/8, 9, 101

[56] References Cited

FOREIGN PATENT DOCUMENTS 1396903 3/1965 France .
1268170 3/1972 United Kingdom ................ 544/128

*Primary Examiner*—Henry R. Jiles
*Assistant Examiner*—J. G. Mullins
*Attorney, Agent, or Firm*—Wenderoth, Lind & Ponack

[57] ABSTRACT

There are described novel cationic quinophthalone compounds of the formula I

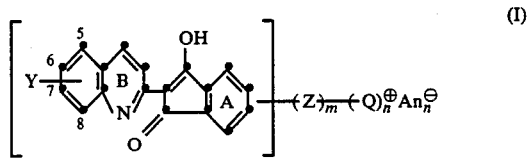

wherein the symbols have the meanings defined in claim 1, and also processes for producing them. These novel quinophthalone compounds can be used in particular as dyes for dyeing and printing paper, greenish-yellow dyeings having good fastness to water and to light being obtained.

9 Claims, No Drawings

BENZOQUINOPHTHALONE QUATERNARY AMMONIUM SALT DERIVATIVES

This application is a division of application Ser. No. 672,869, filed Nov. 19, 1984 (now U.S. Pat. No. 4,588,811), which application is, in turn, a continuation of application Ser. No. 471,555, filed Mar. 3, 1983 (now abandoned).

The invention relates to novel quinophthalone compounds of the formula I

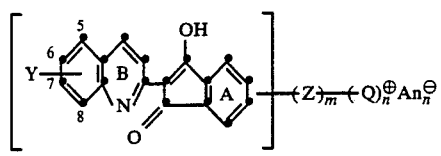

wherein
Y is either a substituent of the formula

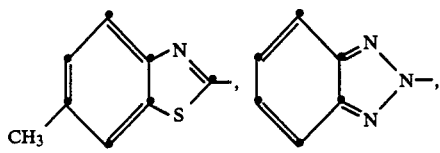

or a benzene ring which is annularly-linked in the 5/6- or 7/8-position, and these substituents and benzene rings can be substituted;
Z is a polyvalent bridge member;
Q is a cationic radical of the formula

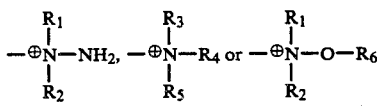

in which $R_1$ to $R_6$ independently of one another are each an unsubstituted or substituted $C_1$-$C_4$—alkyl group, or $R_1$ and $R_2$ or $R_3$ and $R_4$ or $R_3$ and $R_4$ and $R_5$ together with the N atom form in each case a heterocyclic ring;
m is 1 or 2, preferably 1;
n is 1 or 2, especially 1; and
An is an anion;
and wherein the nuclei A and/or B can be substituted.

The defined substituent Y or annularly-linked benzene ring Y can be substituted. Substituents are for example: the OH group, a $C_1$-$C_4$—alkyl group (straight-chain or branched-chain) or halogen, such as fluorine, chlorine or bromine.

In preferred quinophthalone compounds, Y is in particular the substituent of the formula

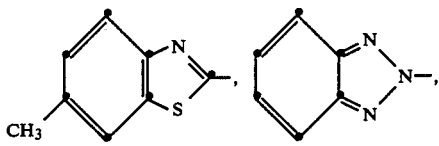

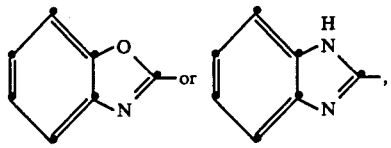

or a benzene ring annularly-linked in the 5/6- or 7/8-position.

In the case of the polyvalent bridge-member Z, it is for example any one of the following groups:

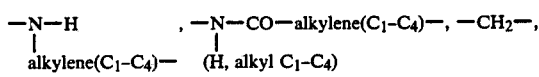

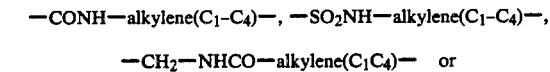

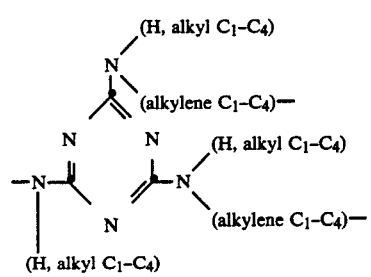

wherein each of the alkyl and alkylene groups can be further substituted, for example by OH, halogen (F, Cl or Br), $NH_2$ and

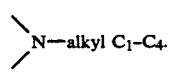

Preferred bridge members Z are:
—NH—CH$_2$CH(OH)—CH$_2$—, —CH$_2$—NHCO—alkylene($C_1$-$C_4$)— especially —CH$_2$—NHCO—CH$_2$— and

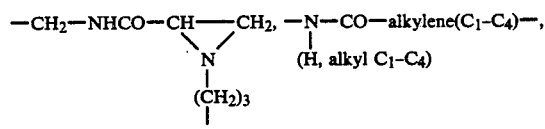

particularly —NHCO—CH$_2$— and

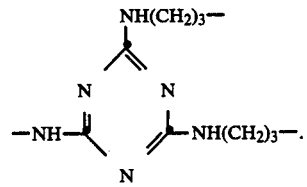

When $R_1$ to $R_6$ are each a substituted $C_1$-$C_4$—alkyl group, a possible substituent is especially the —OH, —$NH_2$, —N(alkyl 1-4)$_2$ or phenyl group.

Where $R_1$ and $R_2$ and/or $R_3$ and $R_4$ including the N atom in each case form a heterocyclic ring, this is for example: the morpholine, pyrrolidine, piperidine, piperazine, imidazole or triazole ring.

If $R_3$ and $R_4$ together with $R_5$ form, with the inclusion of the N atom, a heterocyclic ring, this is for example an unsubstituted or substituted (for example by $C_1$-$C_4$—alkyl) pyridinium ring, or a triethylenediamine ring of the formula

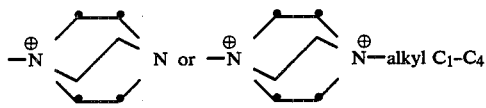

wherein the alkyl group bound to the cationic N atom can also be substituted, for example by $NH_2$, NH—alkyl—$C_1$-$C_4$ and N(alkyl $C_1$-$C_4$)$_2$.

Q is the cationic radical according to definition is for example any one of the following radicals:

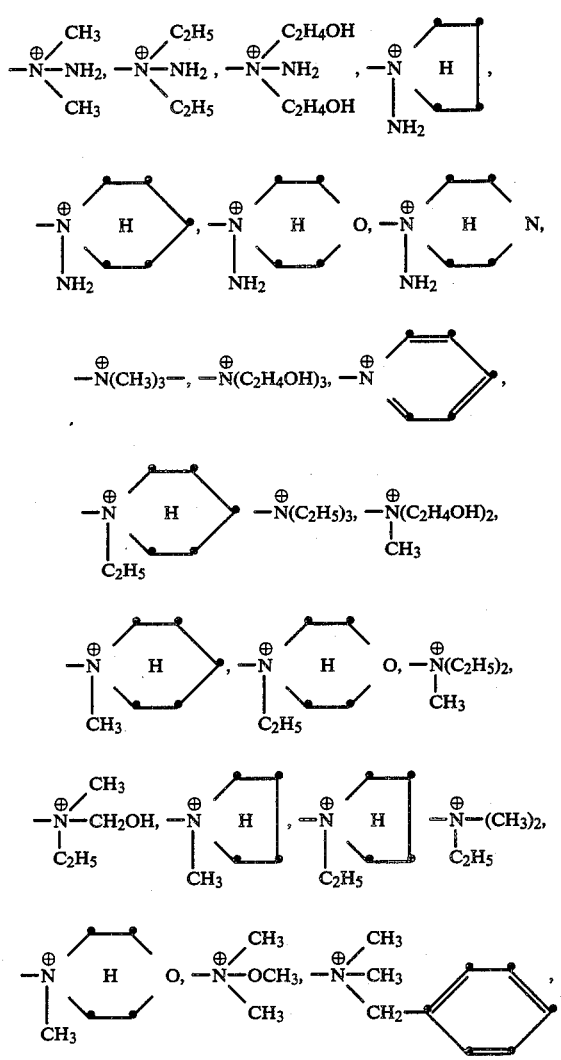

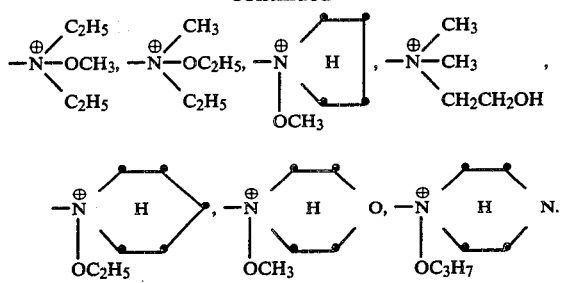

In preferred quinophthalone compounds of the formula I, Q is a cationic radical of the formula

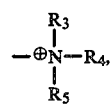

wherein $R_3$, $R_4$ and $R_5$ independently of one another are each an unsubstituted or substituted $C_1$-$C_4$—alkyl group, in particular a trialkylammonium group, such as a trimethylammonium group, or $R_3$, $R_4$ and $R_5$ together with the N atom form a heterocyclic ring, especially a pyridinium ring of the formula

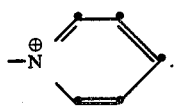

When the nucleus A is substituted, substituents are for example: halogen, such as fluorine, chlorine or bromine; $C_1$-$C_4$—alkyl (straight-chain or branched-chain), $NO_2$, $NH_2$, NHCO—alkyl($C_1$-$C_4$), COO—alkyl($C_1$-$C_4$), $C_1$-$C_4$—alkoxy, S—alkyl($C_1$-$C_4$), $SO_2$—alkyl($C_1$-$C_4$), NHCO—phenyl, COO—phenyl, phenoxy, thiophenoxy and $SO_2$—phenyl. In the preferred quinophthalone compounds, the nucleus A is not further substituted, or is mono- or polysubstituted by halogen, especially chlorine.

Substituents in the nucleus B are for example the following: halogen, such as fluorine, chlorine or bromine; $C_1$-$C_4$—alkyl (staight-chain or branched-chain), OH, $C_1$-$C_4$—alkoxy, phenoxy, NH—alkyl($C_1$-$C_4$), NH—phenyl, S—alkyl—($C_1$-$C_4$), thiophenoxy, $SO_2$—alkyl($C_1$-$C_4$), $SO_2$—phenyl, COO—alkyl($C_1$-$C_4$) and COO—phenyl. In the preferred quinophthalone compounds, the nucleus B is not further substituted.

The grouping $-(Z)_{\overline{m}}$ $(Q)_n \oplus An^\ominus_n$ can be bound to each benzene or phenyl nucleus, or also to the nucleus B.

The term "$C_1$-$C_4$—alkyl" denotes here and in the following for example: the methyl, ethyl, n-propyl, iso-propyl, n-butyl or tert-butyl group; this applies analogously also to "$C_1$-$C_4$—alkylene".

Suitable anions "An" are both inorganic and organic anions; the following are for example mentioned: the halide ion, such as the chloride, bromide or iodide ion, also the sulfate, methylsulfate, borotetrafluoride, aminosulfate, perchlorate, carbonate, bicarbonate, phosphate, phosphomolybdic, phosphotungstic, phosphotungstomolybdic, benzenesulfonate, naphthalenesulfonate, 4-chlorobenzenesulfonate, oxalate, maleate, acetate, propionate, lactate, succinate, chloroacetate, tartrate, methanesulfonate or benzoate ions, or complex anions, such as those of zinc chloride double salts.

The novel quinophthalone compounds of the formula I are readily water-soluble products which are obtained in a known manner. One possible production process comprises condensing a quinaldine compound of the formula III

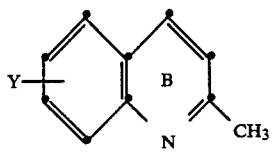

with a phthalic anhydride of the formula IV

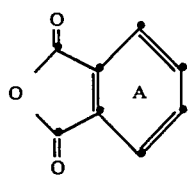

to obtain a condensation product of the formula II

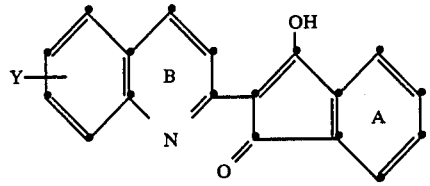

wherein the symbols Y, B and A have the meanings defined under the formula I.

The quinaldine compounds of the formula III are known and can be produced by known methods. There are used for example the following compounds:
5,6-benzoquinaldine,
7,8-benzoquinaldine,
6-(6'-methyl-benzothiazole)-quinaldine, and
6-benzotriazole-quinaldine.

Likewise known are the phthalic anhydride compounds of the formula IV, which can also be produced by known methods. The following compounds can for example be used:
phthalic anhydride,
3,4,5,6-tetrachlorophthalic anhydride,
3-nitrophthalic anhydride, and
4-nitrophthalic anhydride.

The condensation reaction of the compound III with IV proceeds in a known manner (for example: Ann. Chem. Vol. 516, p. 155 [1935]).

Into this condensation product of the formula II is then introduced the grouping $(Z)_m \ (Q)_n^{\oplus} An_n^{\ominus}$ in stages, depending on the meaning of the symbol Z, as follows.

(a) When Z is a —$CH_2$—NHCO—alkylene ($C_1$-$C_4$) group, the condensation product of the formula II is reacted with a methylolamide of the formula HO—$CH_2$—NHCO—alkylene—($C_1$-$C_4$)—Hal to give a product of the formula IIa

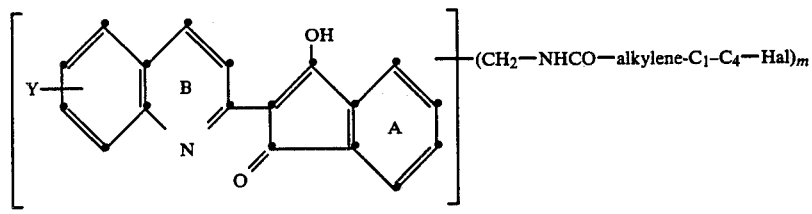

(Einhorn reaction, Angew. Chem. 69, 463 (1957). The reaction is performed in the presence of concentrated sulfuric acid (for example monohydrate) or phosphoric acid, optionally together with phosphorus pentoxide, at a temperature of 0° C. to 50° C., preferably at room temperature. After the introduction of this methylolamide, the cationic group Q is introduced. This is effected for example by reacting the terminal halogen atom "Hal" in the formula IIa with a tertiary amine (corresponding to the radical Q), such as trimethylamine or pyridine; or by reacting this terminal halogen atom "Hal" in the formula IIa with a secondary amine (for example dimethylamine), and subsequently quaternising this in a known manner. The quinophthalone compounds of the formula I are obtained in both cases.

A further applicable production process consists in producing the compound (IIa) in situ by reacting the compound (II) with formaldehyde and an amide of the formula $NH_2CO$—alkylene $C_1$-$C_4$—Hal in the manner described, and then carrying out the further procedure as stated in the foregoing.

(b) In the case where Z is an —NH—alkyl($C_1$-$C_4$) group, a condensation product of the formula II which contains a halogen atom (for example in the nucleus A or B or in a substituent Y) is taken as the starting material, and is reacted with a halogen-amino-alkyl compound of the formula $H_2N$—alkyl($C_1$-$C_4$)—Hal to obtain a product of the formula IIb

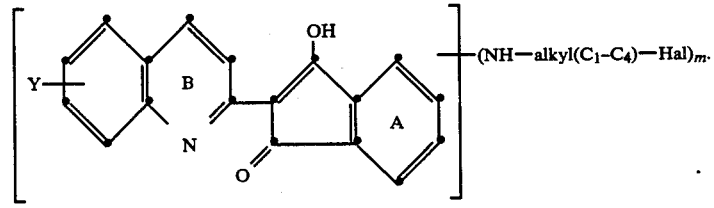

The introduction of the cationic group Q is subsequently effected as described in the process variant (a).

A further production possibility is to use a condensation product of the formula II containing an amino group (for example in the nucleus A or B or in a substituent Y) as the starting material, and to react this with an epoxy compound, for example with the compound of the formula

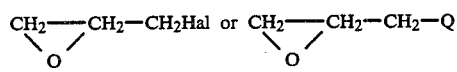

to give a product of the formula

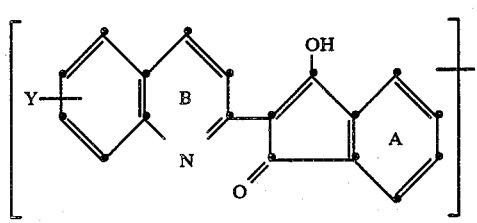

or

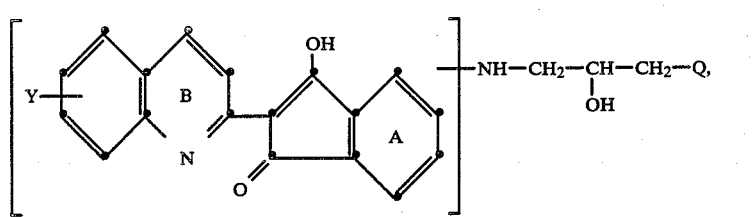

the "Hal" atom in product A being subsequently replaced with the radical Q.

(c) Where Z is a —CH$_2$ group, the introduction of this group into the condensation product of the formula II is performed for example by reacting this with formaldehyde and hydrochloric acid to a product of the formula IIc

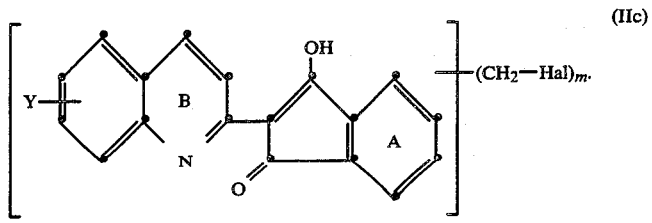

The introduction of the cationic group Q is subsequently effected in the manner described under process variant (a).

(d) If the symbol Z is a —CONH—alkylene(C$_1$-C$_4$) group or an —SO$_2$NH—alkylene(C$_1$-C$_4$) group, a condensation product of the formula II containing a COOH or SO$_3$H group (for example in the nucleus A or B) is advantageously used as the starting material, and this is reacted with a halogen-amino-alkyl compound NH$_2$—alkylene(C$_1$-C$_4$)—Hal to obtain a product of the formula IId$_1$

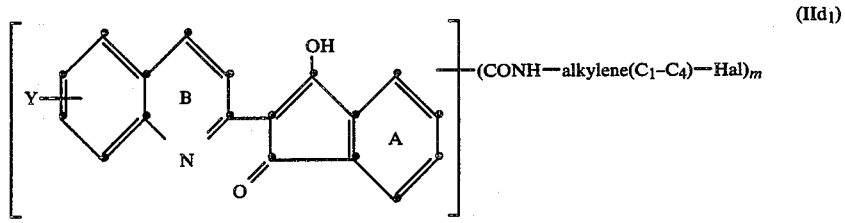

or a product of the formula IId$_2$

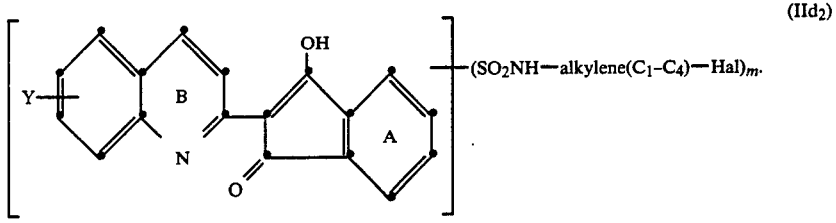
(IId₂)

The introduction of the cationic group Q is subsequently effected in the manner described under process variant (a).

(e) When Z is the grouping

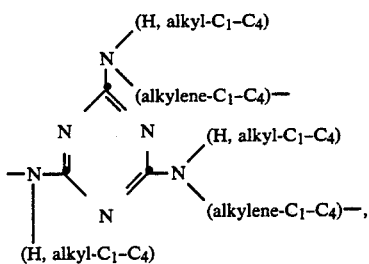

this grouping is advantageously introduced by starting with a condensation product of the formula II containing an amino group, and reacting this product with cyanuric chloride (optionally also cyanuric fluoride) to give a compound of the formula IIe

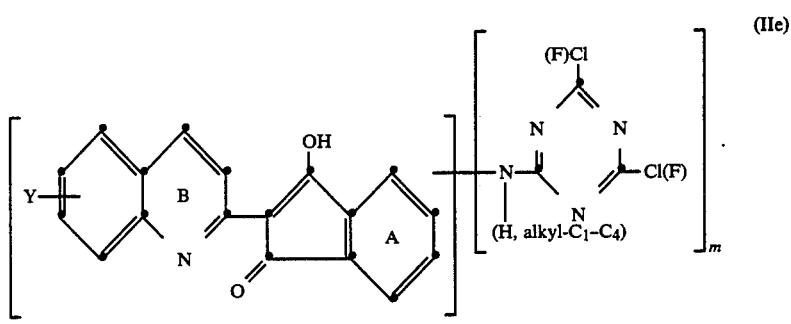
(IIe)

This compound IIe is subsequently reacted with two mols of a diaminoalkyl compound of the formula $H_2N[alkyl-C_1-C_4-N(alkyl-C_1-C_4)_2]$ or $HN[alkyl-C_1-C_4-N(alkyl-C_1-C_4)_2]_2$, and the terminal dialkylamino group is quaternised to obtain the group Q as defined.

(f) Where Z is the grouping

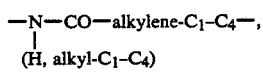

this group can be introduced for example by starting with a condensation product of the formula II containing an amino group, and reacting this product with a compound of the formula $Hal-CO-alkylene-C_1-C_4-Hal$, with subsequent introduction of the cationic group Q in the manner described in the process variant (a).

The novel quinophthalone compounds of the formula I are used in particular as dyes for dyeing and printing textile materials, paper or leather, and for preparing inks.

In cases where these dyes are used for dyeing and printing textile materials, suitable as such are wool, silk and polyamide materials modified with acid groups; as well as polyacrylonitrile materials, especially in the form of wet tow; and also modified polyester materials dyeable with basic dyes. Also suitable are natural and regenerated cellulose materials, specially cotton and viscose, with brilliant yellow dyeings being in part obtained. The dyes of the formula I according to the invention have on these materials, particularly on the stated cellulose materials, good substantivity, a high degree of exhaustion and a good build-up; and the dyeings obtained have good fastness properties, especially good fastness to wet processing and to light.

The novel dyes are suitable also for dyeing polyacrylonitrile in the spinning solution.

A preferred use of the dyes of the formula I according to the invention is for the dyeing of paper of all types, particularly bleached and sized, lignin-free paper, and also semi-cardboard and cardboard. These dyes are more especially suitable for dyeing unsized paper (for example serviettes) by virtue of the very higher standard affinity of the dyes for this substrate.

The dyes according to the invention exhaust very well onto these substrates, the waste liquors—even with deep shades (up to above 1/1 RT=reference type strength)—being left colourless, a factor which is of great technical and ecological advantage, especially in view of the present-day effluent laws. The high degree of exhaustion is advantageous also with regard to good reproducibility of the shade. Furthermore, the degree of exhaustion is virtually unaffected by the hardness of the water. The dyeings are fast to wetting, that is to say, they exhibit no tendency to bleed when dyed paper in the wet state is brought into contact with moist white paper. This property is particularly desirable for serviettes, in the case of which it is foreseeable that the dyed paper in the wet condition (for example soaked with water, alcohol, tenside solution, and so forth) will come into contact with other surfaces, such as textiles, paper, and the like, which have to be protected against soiling.

The good affinity for paper and the high degree of exhaustion of the dyes according to the invention, combined with very good build-up properties, are of great advantage for the continuous dyeing of paper, and render possible a very broad and economical application of these novel dyes. They have the following advantages:

(a) an easier and more rapid correction of the shade, and therefore less loss of paper not conforming to type (scrap);

(b) a better constancy of shade (no "tailing"); and (c) there is no necessity to thoroughly clean the stirring vat after each batch, the working process simultaneously being shortened and the process thus optimized.

The yellow dyeings are brilliant and have very good fastness properties, especially fastness to light.

The dyes of the formula I are suitable also for dyeing leather materials by the widest variety of application methods, such as spraying, brushing and dipping, and for preparing inks of all types, such as for ball-point pens and for printing inks.

The invention is further illustrated by the following Examples without being limited by them. The temperatures are in degrees centigrade, 'parts' denote parts by weight, and percentages are percent by weight.

The abbreviation RKN is a quality designation, and indicates the degree of purity of the cellulose; the abbreviation SR=Schopper-Riegler denotes the freeness value.

EXAMPLE 1

16 parts of the condensation product from 5,6-benzoquinaldine and phthalic anhydride are introduced with 7 parts of N-methylolchloroacetamide at 0°–5° C. into 100 parts of monohydrate, and the mixture is stirred until no starting material is visible in the thin-layer chromatogram. The reaction mixture is poured onto ice, whereupon the reaction product precipitates; it is then filtered off and washed neutral with water. The yield after drying is 20 parts of the compound

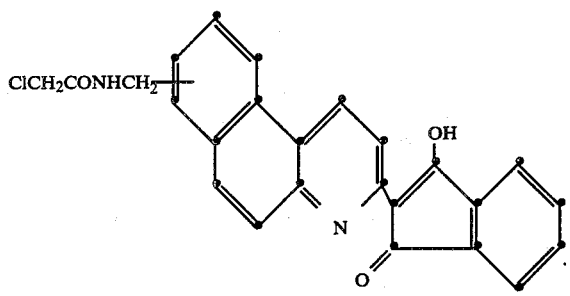

10 parts of this compound in 100 parts of pyridine are heated at 100° C. for 1 hour. The precipitated quinophthalone compound of the formula

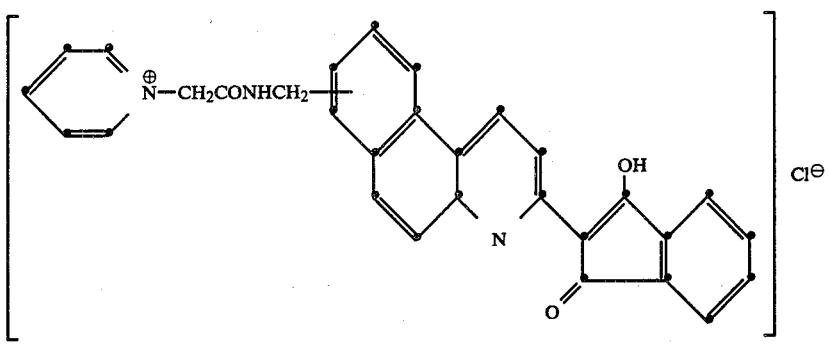

is isolated by filtration and dried. It is very readily soluble in water, and dyes paper in a brilliant, deeply-coloured, greenish-yellow shade having very good fastness properties (particularly fastness to light), and exhibits an excellent build-up (colourless waste liquor).

EXAMPLE 2

The procedure is carried out as in Example 1 except that the 100 parts of pyridine are replaced with 100 parts of a 20% aqueous trimethylamine solution. There is thus obtained the dye of the formula

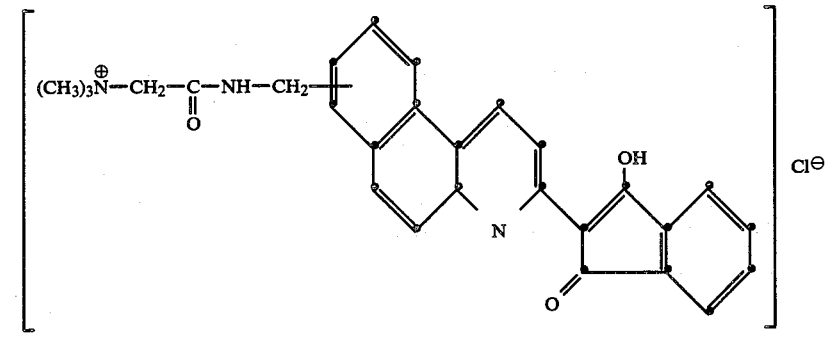

This dye exhibits an excellent build-up on paper, and the waste liquor is colourless.

When in Example 1 the 16 parts of the starting base are replaced with the equivalent amount of the respective starting bases (quinophthalones) listed in the following Table 1, column 2, the procedure otherwise being as described, there are obtained similar dyes, the shades of which on paper are given in column 3.

TABLE 1

| 1 Ex. | 2 Quinophthalones | 3 Shade on paper |
|---|---|---|
| 3 | (structure) | yellow |
| 4 | (structure) | yellow |
| 5 | (structure) | yellow |
| 6 | (structure) | yellow |
| 7 | (structure) | yellow |

TABLE 1-continued

| Ex. | Quinophthalones | Shade on paper |
|---|---|---|
| 8 | 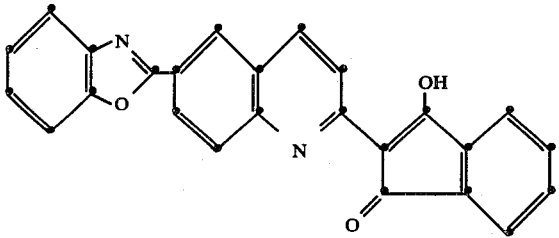 | yellow |
| 9 | 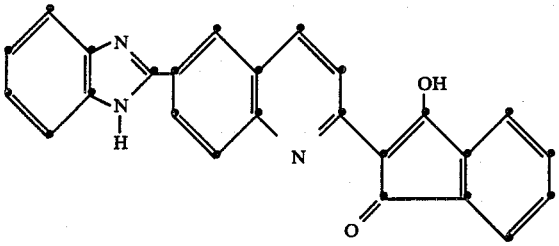 | yellow |

EXAMPLE 10

17 parts of the amino-quinophthalone compound of the formula

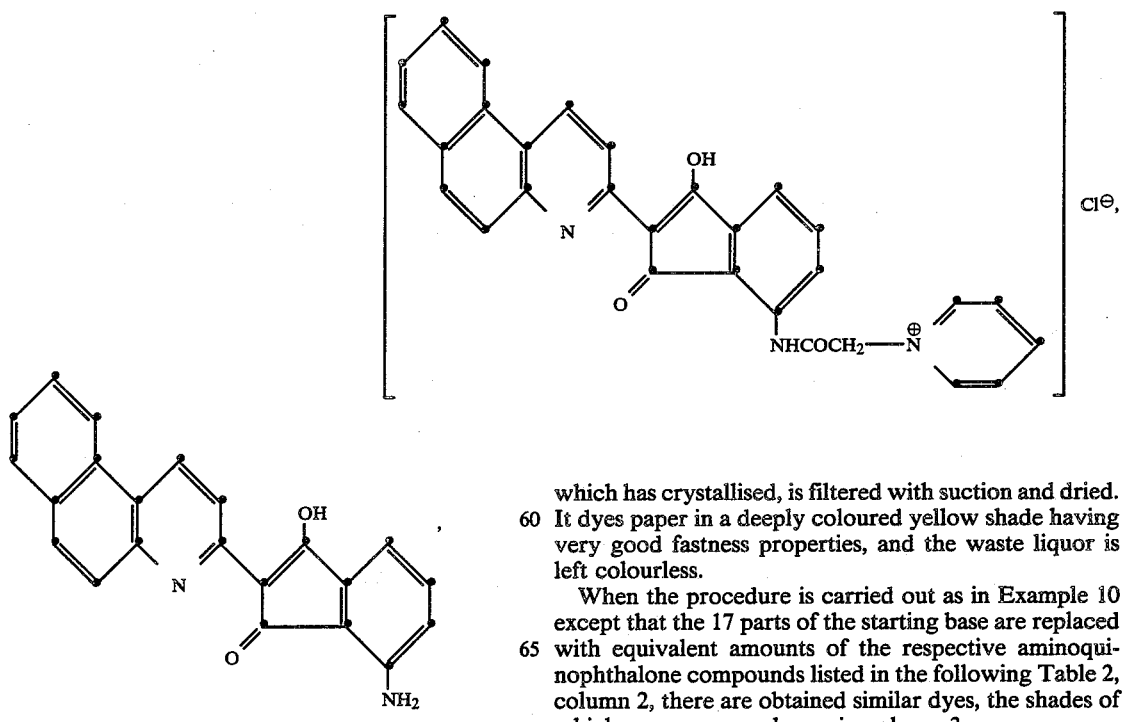

obtained by condensation of 5,6-benzoquinaldine and 3-nitrophthalic anhydride, and subsequent reduction of the nitro group with sodium sulfide, are dissolved in 200 parts of dimethylformamide, and to the solution at 50° C. are added 6 parts of chloroacetyl chloride. When the thin-layer chromatogram shows no further starting material, 20 parts of pyridine are added. The mixture is stirred at 100° C. for 60 minutes and is then cooled. The dye of the formula which has crystallised, is filtered with suction and dried. It dyes paper in a deeply coloured yellow shade having very good fastness properties, and the waste liquor is left colourless.

When the procedure is carried out as in Example 10 except that the 17 parts of the starting base are replaced with equivalent amounts of the respective aminoquinophthalone compounds listed in the following Table 2, column 2, there are obtained similar dyes, the shades of which on paper are shown in column 3.

TABLE 2

| Ex. | Quinophthalones | Shade on paper |
|---|---|---|
| 11 | | yellow |
| 12 | | yellow |
| 13 | | yellow |
| 14 | | yellow |
| 15 | | yellow |

TABLE 2-continued

| Ex. | Quinophthalones | Shade on paper |
|---|---|---|
| 16 | | yellow |
| 17 | | yellow |

EXAMPLE 18

13 parts of the amino-quinophthalone compound according to Example 7 are suspended in 60 parts of nitrobenzene, and are reacted with 8.1 parts of 2,4,6-trichlorotriazine in the presence and 5.4 parts of N,N-dimethylaniline. The reaction product which has precipitated is filtered off with suction, washed, and then suspended in 80 parts of toluene. Reaction with 12.4 parts of 1-amino-3-dimethylaminopropane yields the intermediate of the formula

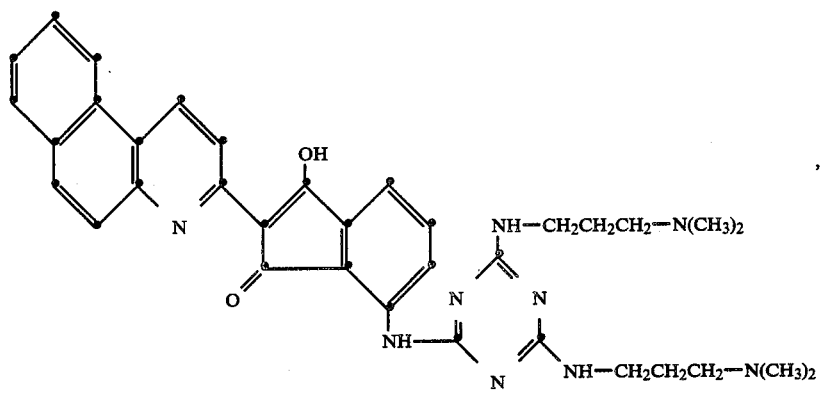

which is quaternised with dimethyl sulfate in the customary manner. The resulting product of the formula

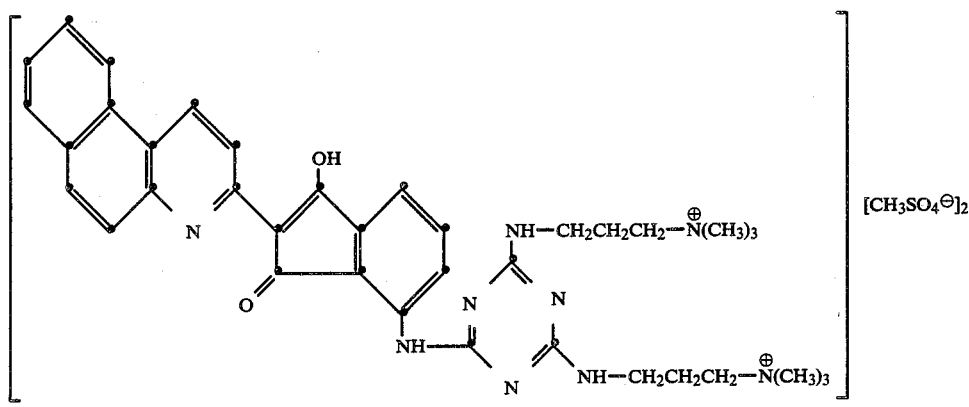

dyes paper in deeply coloured yellow shades, and the waste liquor is left colourless.

Similar dyes having equally good dyeing properties are obtained by replacing in the above Example the 13 parts of the amino-quinophthalone compound with corresponding parts of an amino-quinophthalone from the Table 2, column 2, under otherwise the same reaction conditions.

EXAMPLE 19

50 parts of chemically bleached beechwood sulfite are mixed with 50 parts of bleached sulfite RKN 15 (freeness value 20° SR) and 2 parts of the quinophthalone compound according to Example 1 in water (pH 6, water hardness 10° dH, temperature 20° C., ratio of goods to liquor 1:4). After 15 minutes' stirring, paper sheets are produced on a Frank sheet-former. The paper has been dyed in a very intense, brilliant, yellow shade which is fast to light. The degree of exhaustion attained is 100%, and the waste liquor is colourless.

What is claimed is:

1. A quinophthalone compound of the formula

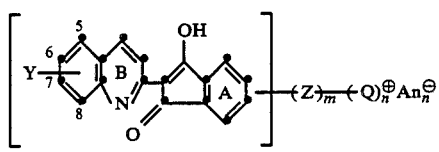

wherein

Y is a benzene ring which is annularly-linked in the 5/6 or 7/8 positions, said benzene ring being unsubstituted or substituted by OH, $C_1$-$C_4$—alkyl or halogen, Z is a polyvalent bridge member selected from the group consisting of

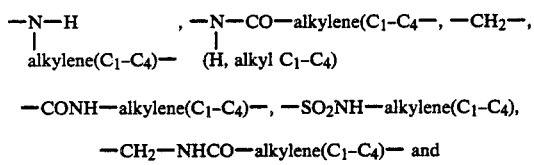

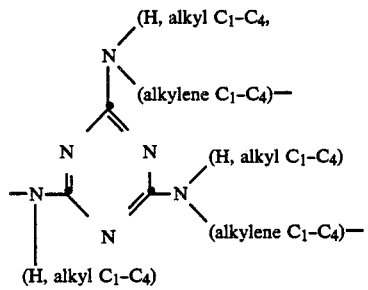

wherein each of the alkyl and alkylene groups appearing in said members is unsubstituted or is further substituted by OH, halogen, $NH_2$ or

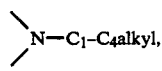

Q is a cationic radical of the formula

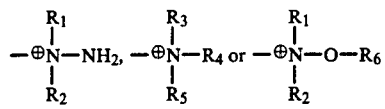

in which $R_1$ to $R_6$ independently of one another are each $C_1$-$C_4$ alkyl which is unsubstituted or substituted by OH, $NH_2$, —N($C_1$-$C_4$alkyl)$_2$ or phenyl, or $R_1$ and $R_2$ or $R_3$ and $R_4$ together with the N atom form in each case the morpholine, pyrrolidine, piperidine, piperazine, imidazole or triazole ring; or $R_3$ and $R_4$ and $R_5$ together form the pyridinium ring which is unsubstituted or substituted by $C_1$-$C_4$—alkyl, or form a triethylenediamine ring of the formula

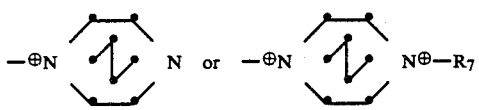

wherein $R_7$ is $C_1$-$C_4$—alkyl which is unsubstituted or substituted by —$NH_2$, —NH—$C_1$-$C_4$—alkyl or —N($C_1$-$C_4$—alkyl)$_2$, m is 1 or 2, n is 1 or 2, and An is an anion;

and wherein the nucleus A is unsubstituted or is substituted by halogen, straight or branched chain $C_1$-$C_4$ alkyl, $NO_2$, $NH_2$, NHCO—$C_1$-$C_4$alkyl, COO—$C_1$-$C_4$alkyl, $C_1$-$C_4$alkoxy, S—$C_1$-$C_4$alkyl, $SO_2$—$C_1$-$C_4$alkyl, NHCO—phenyl, COO—phenyl, phenoxy, thiophenoxy or $SO_2$—phenyl and the nulceus B is unsubstituted or is substituted by halogen, straight or branched chain $C_1$-$C_4$ alkyl, OH, $C_1$-$C_4$alkoxy, phenoxy, NH—$C_1$-$C_4$alkyl, NH—phenyl, S—$C_1$-$C_4$alkyl, thiophenoxy, $SO_2$—$C_1$-$C_4$alkyl, $SO_2$—phenyl, COO—$C_1$-$C_4$alkyl, or COO—phenyl.

2. A quinophthalone compound according to claim 1, wherein the nuclei A and B are not further substituted, except optionally by the grouping $-(Z)_{\overline{m}}(Q)_n^\oplus An^\ominus_n$, or wherein the nucleus A is substituted by halogen.

3. A quinophthalone compound according to claim 1, wherein Z is a polyvalent bridge member selected from the group consisting of

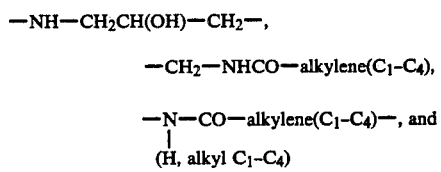

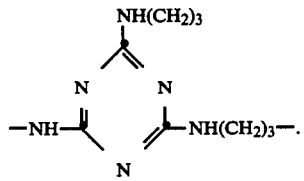

4. A quinophthalone compound according to claim 1 wherein Z is —$CH_2NHCO$—$CH_2$— or

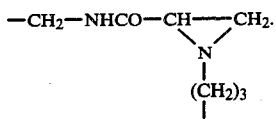

5. A quinophthalone compound according to claim 1 wherein Z is —CH$_2$—NHCO—CH$_2$—.

6. A quinophthalone compound according to claim 1, wherein Q is a cationic radical of the formula

7. A quinophthalone compound according to claim 6 wherein Q is the pyridinium ring of the formula

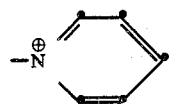

8. A quinophthalone compound according to claim 1, wherein m is the number 1.

9. A quinophthalone compound according to claim 1 wherein:
  the nucleus B is unsubstituted,
  the nucleus A is unsubstituted, or is substituted by halogen, or optionally by the grouping $-(Z)_{\overline{m}}(Q)_n^\oplus An^\ominus_n$,
  Z is a polyvalent bridge member of the formula —CH$_2$NHCOCH$_2$—, NHCOCH$_2$— or

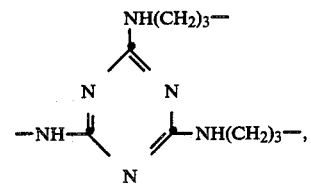

Q is a cationic radical of the formula

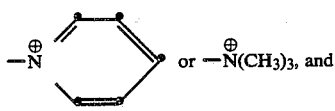

m is the number 1.

* * * * *

UNITED STATES PATENT AND TRADEMARK OFFICE
CERTIFICATE OF CORRECTION

PATENT NO. : 4,656,268
DATED : April 7, 1987
INVENTOR(S) : JEAN-MARIE ADAM

It is certified that error appears in the above-identified patent and that said Letters Patent is hereby corrected as shown below:

On the cover page of the patent, the left hand column, under [60], change "March 3, 1983" to --March 2, 1983--.

Signed and Sealed this

Twenty-ninth Day of September, 1987

Attest:

DONALD J. QUIGG

Attesting Officer     Commissioner of Patents and Trademarks